United States Patent
St. Clair, II

[11] 3,802,772
[45] Apr. 9, 1974

[54] SLIDE PROJECTOR PROGRAMMER

[76] Inventor: John Q. St. Clair, II, 52 Kings Courts Ave., Condado, P.R.

[22] Filed: Jan. 22, 1973

[21] Appl. No.: 325,647

[52] U.S. Cl. ............................................... 353/94
[51] Int. Cl. ........................................ G03b 21/26
[58] Field of Search .................. 353/25, 30, 82, 94

[56] References Cited
UNITED STATES PATENTS
3,594,077  7/1971  Marquis et al. ..................... 353/15
3,686,505  8/1972  De Pasquale ....................... 353/30

Primary Examiner—Samuel B. Rothberg
Assistant Examiner—Steven L. Stephan
Attorney, Agent, or Firm—Harvey M. Mortimer

[57] ABSTRACT

There is disclosed a programmer control for a plurality of slide projectors wherein one projector is provided with a programming card keyed to movement of its magazine which synchronizes the operation of other projectors in accordance with a predetermined program relative to the operation of the master projector; in the preferred embodiment, the programming is carried out by an opto-electronic apparatus cooperating with a programming card having selectively punched holes to determine the programming as between the master projector and slave projectors for both forward and reverse stepping.

9 Claims, 4 Drawing Figures

PATENTED APR 9 1974 3,802,772

SLIDE PROJECTOR PROGRAMMER

Slide projectors are widely used in audio visual communication, and it is very common to develop a slide program with s predetermined order of slides to be projected to accompany a lecture or recorded audio presentation. This invention relates to the use of multiple projectors in such a program and provides certain significant improvements over previous arrangements employing multiple projectors.

Remote control of the projectors by push-button control is, of course, well-known. It is also well-known to have such controls for forward and reverse operation of projectors. One means for controlling multiple projectors utilizes a common remote control button which advances two or more projectors simultaneously. A multiple projection visual program, however, usually contemplates that the picture being projected by one projector will often be changed without changing the picture projected by one or more of the other projectors. This possibility greatly enhances the variations which can be achieved in the visual program. If, however, all projectors are activated simultaneously, it is necessary to provide duplicate slides to avoid changing the image of one projector while that of another is being changed. Even this is unsatisfactory due to the darkening of the screen during slide change which is distractive to the audience and subverts the effect which one desires to create.

It is also possible, of course, for the lecturer to be provided with individual control units for each projector so that he may index any or all of the projectors to new material as he desires. This is not a desirable approach to the problem, however, since it requires the lecturer to memorize or read from the program and greatly distracts the lecturer's attention from his principal business. Of course, individual controls for projectors also detract from the smoothness of the program and render the execution of the program subject to the lecturer's manual dexterity.

According to the present invention, a multiple slide projector programming system is provided which permits the program to be set up in a simple and reliable manner whereby any number (one, two or three) of the projectors may be advanced at a given point in the sequence in response to a simple advance signal by the lecturer. Furthermore, the system permits the program to be reversed, and later returned to the forward advance mode, without interfering with the synchronization of the program.

The physical apparatus required for the present invention is relatively simple and trouble-free and arranged to attach to a standard rotating slide tray projector such as a Kodak carousel.

The program for use with the present system is prepared simply by punching holes in the program card of paper or other opaque sheet material. No electrical connections are required within the projector or the projector control mechanism.

The program card fits conveniently on the rotatable slide tray of the master projector and is readily viewable to ascertain the projector control program at any time. In the preferred embodiment, the sensor for the program card is an opto-electronic sensor which is detachably secured to the master projector to extend over the rotatable slide tray and the program card resting thereon.

The apparatus of the present invention accordingly provides a simple attachment to ordinary slide projector apparatus which converts it into a rather sophisticated audio visual control system for the presentation of programmed multiple images in coordination with a lecture or other audio material.

In addition to providing the advantages described above, it is an object of the present invention to provide apparatus for program control of multiple slide projectors in which a simple optical sensing mechanism senses instructions from a program card which moves in synchronization with the slide tray of a master projector.

It is another object of the present invention to provide a program control for slide projectors in which program instructions are sensed from a master slide projector by means of an optical detector detecting relative opacity in portions of a program sheet and wherein the light source is the projector lamp.

It is a still further object of the present invention to provide a program control for multiple slide projectors in which separate commands are provided for a forward and reverse operation based upon the position of the slide tray of the master projector, thus assuring that synchronization of the program may be maintained notwithstanding reversals in the direction of operation of the master projector.

Other objects and advantages of the invention will be apparent from consideration of the following specification in conjunction with the appended drawings, in which FIG. 1 is a perspective view of three slide projectors equipped with the slide projector programmer of the present invention.

Figure 1:
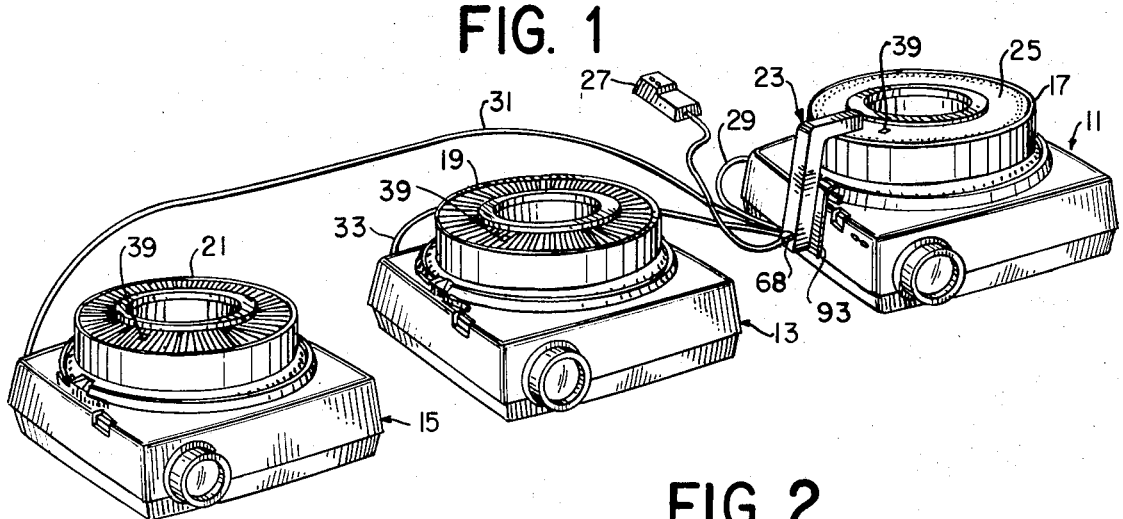

Referring to FIG. 1, three slide projectors 11, 13 and 15 are illustrated which are of the rotating magazine type such as a "Carousel" projector manufactured by Eastman Kodak. Specifically, the projector may be considered to be of the type denominated Model 650H although numerous other "Carousel" Models will also accept the programmer. Those skilled in the art will readily appreciate that other rotatable magazine projectors may be provided with specially adapted slide projector programmers in accordance with the present invention.

The slide projectors 11, 13 and 15 are each provided with respective rotatable slide magazines 17, 19 and 21. The slide projector programmer apparatus according to the present invention includes the sensor and electronics housing 23. A programmer card 25 functions as the program for the slide projector programmer and rests on and rotates with the rotatable magazine 17 of the master projector 11.

The slide projector programmer may utilize the standard remote control unit 27 for the projector 11. The programmer apparatus supplies signals by way of cords 29, 31 and 33 to the three slide projectors for indexing the projectors under the control of the program.

The retaining ring 35 for the slides also serves to retain the program card 25. The program card 25 is provided with indicia which correspond to the slide numbers, in this case 1 to 80 by way of example. It should be noted that for reasons later to be explained, the program card index numbers are offset one step from the index numbers on the rotatable slide magazine 17. Proper orientation of the program card relative to the rotatable slide magazine is assured by the index hole 37 which engages a projection 39 on the magazine 17.

The program card 25 is provided with two circular rows of perforated circles 41 and 42 which may be punched out to determine the slide projection program. The outer perforated circles 41, or more particularly the holes punched from such circles, will control the first slave projector 13 while the inner row of perforated circles 42 will control the second slave projector 15.

As will later be explained in more detail, the essence of the programming system is to utilize the master projector 11 for those slides which will change in every instance whereas the slave projectors 13 and 15 are utilized for slides which will change in some instances and will not change in other instances. Whether or not the slide projectors 13 and 15 change slides with the master projector will be controlled by the holes punched from perforated circles 41 and 42 in the program card 25.

Holes 41 and 42 are optically sensed by the apparatus housed in the sensor and electronics housing 23. The projector is, of course, provided with a light source 45, and the usual projector construction permits substantial light to be reflected, scattered or otherwise directed up through the slide gate area through an opening such as 47. Accordingly, the card 25 is illuminated from below in the area of the housing 23. Best results are obtained by offsetting the program card as shown.

Figure 3:
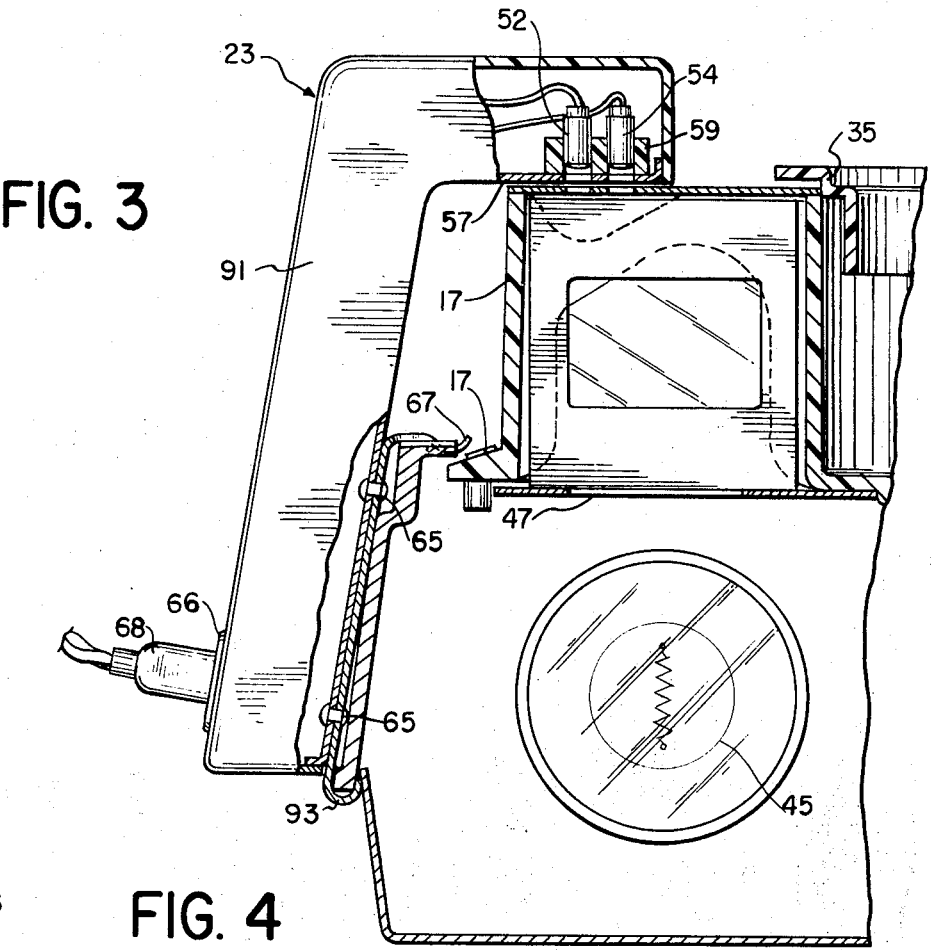
FIG. 3 is a front view of the apparatus of FIG. 2 taken along the line 3—3 in FIG. 2.

As shown in FIG. 3, photosensors 52 and 54 are arranged to sense holes punched out from perforated circles 41 and 42. For reasons later explained, additional photosensors 51 and 53 are provided on a radius adjacent that occupied by sensors 52 and 54. As an explicit example, the light sensors 51-54 are illustrated as photosensitive resistor elements. While this provides a simple and convenient arrangement, obviously other types of photoelectric transducers could be utilized in the system. The housing 23 includes a frame 57 together with a mounting 59 for locating and securing the photosensor units 51-54. A cover 91 is provided for the housing formed preferably of an insulating plastic material. The housing 23 may be located on the projector and secured thereto in any suitable fashion. In the particular example shown, the projector is susceptible of having the housing clipped on by means of a clip 93 secured to frame 57 by rivets or other suitable fasteners 65. The clip 93 is preferably formed of spring metal and has a detent portion 67 engaging the top side wall of the projector. The clip 93 also has a notch 69 which engages a projection on the projector housing and indexes the electronics and sensor housing 23 at the proper position relative to the magazine advance mechanism of the projector.

The fastening arrangement including the clip 93 will be seen to provide an unusually simple and effective means for properly attaching the electronics and sensor housing to the master projector without requiring any change to the projector. The insertion of the program card 25 also makes use of existing projector features and requires no change to the projector. It will also be observed that electrical connections are to be made with connectors fitting existing projector electrical connections with a master projector and the slave projectors as well. Accordingly, no modification to the projector equipment of any sort is required so that the system may be readily used with rented or borrowed projectors, and the projectors can afterward be returned to their previous utilization without difficulty.

Figure 4:
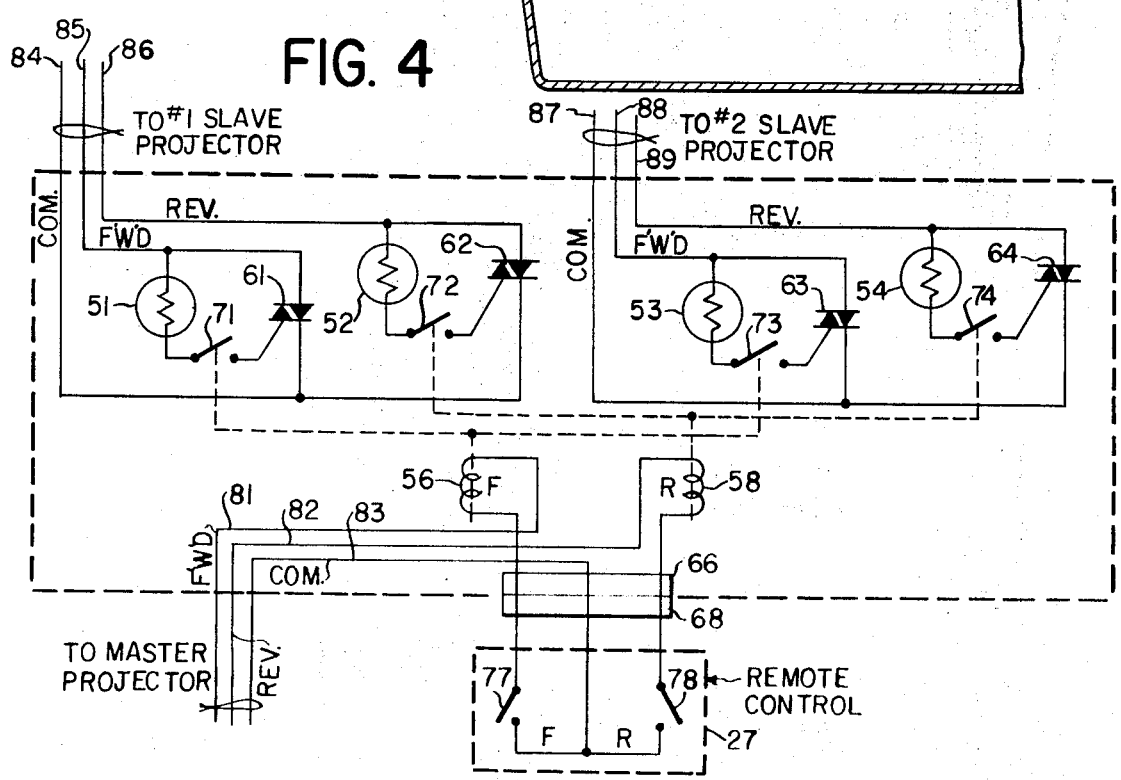
FIG. 4 is a schematic diagram of the slide projector programmer apparatus electrical circuit.

An exemplary electronic circuit is illustrated in FIG. 4 which serves to control the slave projectors in accordance with the program card 25 as sensed by photosensors 51 through 54. The electronic circuit will be mounted in housing 23 by conventional techniques and its physical layout is accordingly not illustrated.

Associated with each of the photosensors 51-54 is a respective semiconductor switch 61-64. The semiconductor switch by way of example may be a triac, even more specifically a triac No. HEP 1721. Semiconductor switches 61 through 64 operate to close a circuit electronically to step the magazine control mechanisms of the slave projectors in either the forward or reverse direction. The switching signal for each of the semiconductor switches 61 through 64 is supplied from its respective photosensor 51-54.

It will be noted, however, that the control signal from the photosensor 51 to the semiconductor switch 61 can only be effective when contact 71 of relay 56 is closed. Corresponding contacts 72, 73 and 74 are interposed in the control circuit for semiconductor switches 62, 63 and 64. Semiconductor switches 62 and 64 are controlled by relay 58 rather than relay 56.

The coils of relays 56 and 58 are connected through a socket 66 and a plug 68 to the remote control 27 for the master projector. It will be understood that the usual remote control unit for the projector will plug into socket 66 in the particular example described. Of course, other arrangements for establishing electrical connection could be utilized or a special remote control unit could be supplied with and connected to the sensor and control circuitry. In any case, the remote control 27 is provided with switches 77 and 78 for stepping the master projector in the forward and reverse directions respectively. Electrical leads 81, 82 and 83 extend from the housing to the master projector and preferably will terminate in a plug similar to plug 68 which will plug into the master projector control socket (not shown).

Similarly, leads 84, 85 and 86 extend to slave projector 13, and leads 87, 88 and 89 extend to slave projector 15, in each case preferably connecting by means of a plug accepted in the control socket of the slave projectors.

The creator and/or operator of the visual program would first schedule the slide program by assigning to the master projector slides which are to be changed at each step of the program. Slides which are to be shown for more than one step of the program as well as slides which are to be shown only in a single step of the program may be assigned to either of the slave projectors. The program card will then be created by punching the perforated circles to create a hole for each program step where one of the slave projectors is to be advanced. The outside row of holes on the program card controls the first slave projector 13, and the inside row of holes controls the second slave projector 15. The program card is placed on top of the magazine for the master projector 11 and properly indexed in rotational position by engagement of the projection 39 with the hole 37. The housing 23 is, of course, clipped to the master projector as illustrated in FIGS. 1 and 3. The three cables 29, 31 and 33 plug into the master and the two slave projectors respectively. All projector magazines are set to their starting position.

Figure 2:
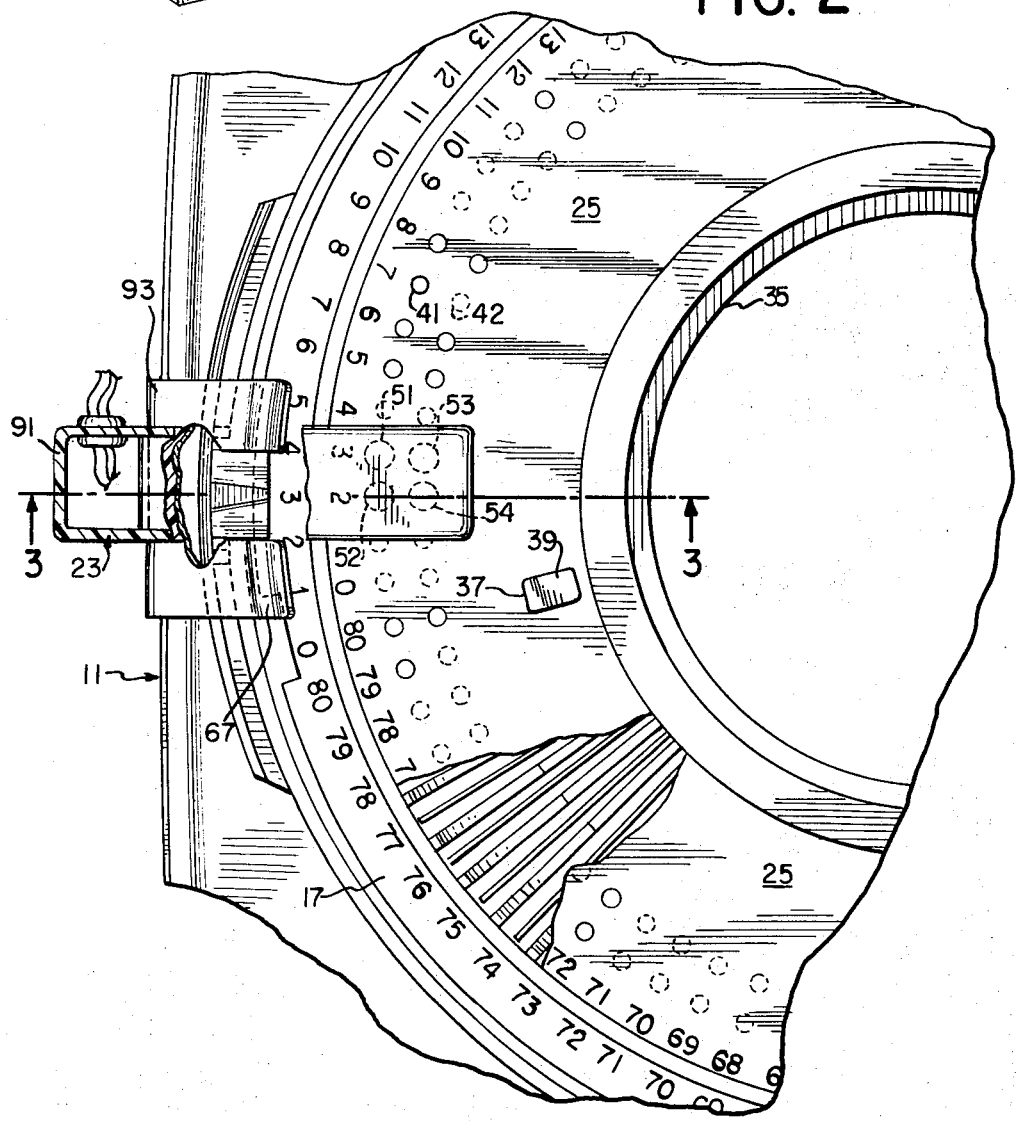
FIG. 2 is a top plan view of the master slide projector equipped with a slide projector programmer according to the invention.

The lecturer or operator changes the slides being projected in the program by pushing the forward button on the remote control 27 closing switch 77. This closes the circuit between the common lead 83 and the forward lead 81 to the master projector actuating the solenoid in the master projector and stepping the master projector magazine forward one step. If the program card 25 does not have a hole punched in radial position 1, then neither the slave projector 13 nor the slave projector 15 will advance and the slides which are projected at step 2 of the program will be the same for the slave projectors but different only for the master projector. This process will be repeated upon successive operations of the forward button of the remote control 27. Using the program card illustrated in FIG. 2 by way of example, it will be noted that at step 7 there is a hole punched in the outer row of perforated circles. This is an instruction that slave projector 13 should step forward from step 7 to step 8 of the program. This is carried out in the operation of the system as follows. At step 7, the forward button is actuated closing switch 77 which actuates both the solenoid of the master projector and the relay 56 which is in series connection with it. Relay 56 thereupon operates to close contacts 71 and 73. In respect to contact 71, its closure places semiconductor switch 61 under the control of the photosensor 51. Photosensor 51 will be over the opening in the outer row of the program card at radial position 7. Sensor 51 will accordingly be illuminated by projector lamp reflected illumination and will cause the semiconductor switch 61 to conduct, thereby actuating a solenoid of slave projector 13 to step forward the magazine of slave projector 13.

Semiconductor switch 63 will also be conditioned to be under control of photosensor 53 due to closure of contact 73. However, photosensor 53 is located over the inside row of perforated circles in which there is no opening at radial position 7. Photosensor 53 thus will not be activated and semiconductor switch 63 will remain nonconductive.

At step 8 of the program, it will be noted that holes appear in both the inside and outside rows of the program card, and in this case both photosensor 51 and photosensor 53 will be activated together with their respective semiconductor switches 61 and 63, thereby causing the magazines of both slave projectors to advance.

From the above description, it will be seen that the program card 25 can be programmed by punching appropriate holes which will coordinate the slave projectors 13 and 15 in any desired sequence with the slide-to-slide advance of the master projector 11.

It is also desirable that the operator have the capability of reversing the program (to cover a point inadvertently omitted or to answer a question or the like). Th slide projector programmer is provided with special features which permit reversed stepping while still maintaining the desired synchronization of the three slide projectors.

For example, consider the condition of the programmer at step 8 of the program. In the event of a forward stepping signal, it is desired that both slave projectors advance to the next slide. However, a reverse step from step 8 should return the slides to the position of step 7 which requires a reverse step for slave projector 13 but no reverse step for slave projector 15. In other words, the desired action in reversing from step 8 to step 7 is the same action that was programmed in advancing from step 7 to step 8. This is accomplished in the programmer apparatus by the second set of photosensors 52 and 54 which are placed over the next lower position number on the program card 25. Photosensors 52 and 54 are activated by closing contacts 72 and 74 connecting photosensors 52 and 54 to the gate lead of semiconductor switches 62 and 64 respectively. Contacts 72 and 74 are controlled by relay 58 which is in turn actuated by the remote control reverse switch 78.

Thus it will be seen that by having separate forward and reverse sensors located in adjacent positions on the program card, the required logic necessary for operating the program in forward or reverse directions while maintaining synchronism is conveniently provided.

It should be noted that while the master projector is contemplated to be controlled by a manual remote control in the description of the exemplary system illustrated here, it is well-known to control a projector with an automatic time-se-quencing device or with synchronizing signals from a tape-recorded audio program. The system may be easily arranged to cooperate with a time sequence control or cue-signal controlled by a tape-recorded program. In some such cases, it may be necessary to provide a forward-reverse control to take over this function automatically effected by the remote control 27 in the illustrated arrangement. The most convenient manner of providing manual forward and reverse control is to provide manually operated switch contacts in parallel with relay contacts 71 through 74. The four contacts would, of course, be arranged so that with the switch in the forward direction, contacts in parallel with contacts 71 and 73 would be closed, while with the switch in the reverse direction, contacts in parallel with contacts 72 and 74 would be closed. A center position may be provided with all contacts open to permit the control to be assumed by relays 56 and 58 and from contacts 71 through 74 as previously described in detail.

Numerous possible variations to the system other than those specifically described will be apparent to those skilled in the art. Thus, the details of other rotating magazine slide projectors may differ so that a slightly different sensing arrangement for the program card may be indicated. While it is obviously simple and effective to use the light from the projector lamp for the sensing function, an inedpendent light source may be provided if desired. Furthermore, the program card specifically described operates by transmitted light through openings in the cards. It will be apparent that the sensing could instead be accomplished by reflected light from circles of aluminized material on a generally dark non-reflective card. Furthermore, the electronic circuit described by way of example is not intended as a most economical production type circuit but is rather a simple workable circuit relatively easy to explain and understand. It may well be that the electromechanical relays of the circuit would be replaced by solid state switching elements or that the photosensor would be replaced by some other form of photosensing element, etc.

From the foregoing description it has been seen that a slide projector programmer is provided which is particularly effective for synchronizing several projectors in a slide projector program in accordance with a prearranged scheme, and that the programmer apparatus is most readily adapted to existing slide projectors such as the Kodak carousel projectors without modification by utilizing the cords and plugs of the programmer apparatus to plug into existing sockets of the projector equipment. Furthermore, the program arrangement has the highly desirable capability of being operated in reverse as well as forward direction without interfering with the synchronization of the projectors. It should be appreciated that in addition to the variations and modifications of the apparatus described or suggested above, other variations will be apparent to those skilled in the art which are nevertheless deemed to be within the scope of the invention to the extent set forth in the appended claims.

What is claimed is:

1. Apparatus for programming a plurality of remotely controllable slide projectors including a movable magazine projector serving as a master projector and at least one slave projector, comprising a program card engageable with a magazine of said master projector for motion therewith, said program card having selectively programmable, optically sensible indicia means, optical sensing means for producing an electrical control signal responsive to said indicia means of said program card positioned at said sensing means, and means for supplying said electrical control signal to said slave projector to step said slave projector according to the program defined by the indicia means of said program card.

2. Apparatus as claimed in claim 1 wherein said optically sensible indicia means comprises light-transparent openings in said program card.

3. Apparatus as claimed in claim 1 wherein said optical sensing means is arranged to utilize stray light from the projector lamp of said master projector as a light source for optically sensing said indicia means.

4. Apparatus as claimed in claim 1 wherein said slide projectors are remotely controllable for reverse motion as well as forward motion and wherein said optical sensing means is arranged to sense said indicia means to operate the program defined by the indicia means in either a forward or reverse direction.

5. Apparatus as claimed in claim 4 wherein said optical sensing means is arranged to utilize stray light from the projector lamp of said master projector as a light source for optically sensing said indicia means.

6. Apparatus as claimed in claim 4 wherein said optical sensing means includes separate optical sensors for forward and reverse direction, and means for activating one or the other of the optical sensors to coordinate the slave projectors for forward or reverse motion.

7. Apparatus as claimed in claim 1 wherein said optical sensing means is further responsive to the stepping control for the master projector such that a slave projector is advanced when the master projector is advanced and the appropriate indicia means appears at the optical sensing means on the program card.

8. Apparatus as claimed in claim 7 wherein said slide projectors are remotely controllable for reverse motion as well as forward motion and wherein said optical sensing means is arranged to sense said indicia means to operate the program defined by the indicia means in either a forward or reverse direction.

9. Apparatus as claimed in claim 1 wherein said movable magazine projector is a rotatable magazine projector and said program card is substantially circular.

* * * * *